United States Patent
Fang et al.

(10) Patent No.: US 10,078,403 B2
(45) Date of Patent: Sep. 18, 2018

(54) CAPACITIVE TOUCH SCREEN TERMINAL AND NEAR FIELD COMMUNICATION METHOD AND SYSTEM THEREOF

(71) Applicant: Shenzhen Goodix Technology Co., Ltd., Shenzhen, Guangdong (CN)

(72) Inventors: Jun Fang, Shenzhen (CN); Siqiu Cheng, Shenzhen (CN)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 266 days.

(21) Appl. No.: 14/786,540

(22) PCT Filed: Jun. 25, 2014

(86) PCT No.: PCT/CN2014/080716
§ 371 (c)(1),
(2) Date: Oct. 22, 2015

(87) PCT Pub. No.: WO2015/021824
PCT Pub. Date: Feb. 19, 2015

(65) Prior Publication Data
US 2016/0070385 A1 Mar. 10, 2016

(30) Foreign Application Priority Data
Aug. 13, 2013 (CN) .......................... 2013 1 0351529

(51) Int. Cl.
G06F 3/044 (2006.01)
H04B 5/00 (2006.01)
(Continued)

(52) U.S. Cl.
CPC ............ *G06F 3/044* (2013.01); *G06F 3/0416* (2013.01); *H04B 5/0012* (2013.01); *H04B 5/0031* (2013.01); *H04W 4/80* (2018.02)

(58) Field of Classification Search
CPC ...... G06F 3/044; G06F 3/0416; H04W 4/008; H04B 5/0012; H04B 5/0031
See application file for complete search history.

(56) References Cited

U.S. PATENT DOCUMENTS

2002/0122064 A1* 9/2002 Yamakado .......... G06F 3/03545
715/766
2003/0125074 A1* 7/2003 Tanada .............. H04M 1/72513
455/552.1
(Continued)

FOREIGN PATENT DOCUMENTS

| CN | 102035576 A | | 4/2011 | |
|---|---|---|---|---|
| CN | 202334469 U | | 7/2012 | |
| CN | 102916729 A | * | 2/2013 | ........... H04B 5/0087 |

OTHER PUBLICATIONS

Office Action for corresponding Chinese Application No. 201310351529.3, Applicant: Shenzhen Huiding Technology Co., Ltd., dated Oct. 13, 2015, 7 pages.
(Continued)

*Primary Examiner* — Amare Mengistu
*Assistant Examiner* — Jennifer Zubajlo

(57) ABSTRACT

A capacitive touch screen terminal and a near field communication method and system thereof are provided. In the method and the system, the near field communication is realized through multiplexing driving electrodes and sensing electrodes of a touch sensor in a capacitive touch screen by a transmitting terminal and a receiving terminal, and a frequency sequence is used as a carrier for data transmission. It may be suitable for the near field communication between two capacitive touch screen terminals having a large size difference; meanwhile, after starting the near field communication, the two capacitive touch screens can accurately distinguish whether a change in the electrostatic field is caused by conductors becoming near, or by the terminal communicating with it, wherein the conductors are hand, and so on. Therefore, the reliability while the data transmission is started is improved and the user experience is optimized.

15 Claims, 13 Drawing Sheets

(51) Int. Cl.
*H04W 4/00* (2018.01)
*G06F 3/041* (2006.01)
*H04W 4/80* (2018.01)

(56) References Cited

U.S. PATENT DOCUMENTS

| | | | | |
|---|---|---|---|---|
| 2007/0239981 A1* | 10/2007 | Lessing | ............... | G06K 7/10237 |
| | | | | 713/164 |
| 2010/0179618 A1* | 7/2010 | Marnfeldt | .......... | A61N 1/37252 |
| | | | | 607/60 |
| 2011/0304583 A1* | 12/2011 | Kruglick | ................. | G06F 3/044 |
| | | | | 345/174 |
| 2012/0040610 A1* | 2/2012 | Moosavi | ........... | H04W 52/0254 |
| | | | | 455/41.1 |
| 2013/0147760 A1* | 6/2013 | Lai | .......................... | G06F 3/044 |
| | | | | 345/174 |
| 2013/0231046 A1* | 9/2013 | Pope | ................. | G06K 9/00013 |
| | | | | 455/41.1 |
| 2014/0199944 A1* | 7/2014 | Ran | ...................... | H04B 5/0087 |
| | | | | 455/41.1 |
| 2015/0172290 A1* | 6/2015 | Lai | ..................... | H04L 63/0876 |
| | | | | 713/155 |

OTHER PUBLICATIONS

International Search Report of PCT Patent Application No. PCT/CN2014/080716 dated Sep. 26, 2014.

* cited by examiner

CAPACITIVE TOUCH SCREEN TERMINAL AND NEAR FIELD COMMUNICATION METHOD AND SYSTEM THEREOF

TECHNICAL FIELD

The present invention belongs to the technical field of near field communication, and particularly, relates to a capacitive touch screen terminal, and near field communication method and system thereof.

BACKGROUND ART

NFC (Near Field Communication, NFC) technology is a short range high frequency wireless communication technology, which enables electronic identity recognition or various types of data transmission, and has been applied in a touch screen terminal now.

In a traditional capacitive touch screen terminal with a near field communication function, a near field communication module and a touch detection module are distributed in different integrated chips. The near field communication module uses a dedicated antenna to realize data transmission with other terminals, while the touch detection module detects whether there is a trigger on a touch panel and a touch position through a driving electrode TX and a sensing electrode RX in the touch sensor. As a result of two integrated chips, it makes a hardware circuit structure complex and bulky.

To solve the above problem, the prior art proposes a near field communication method of a capacitive touch screen terminal. The method realizes the near-field communication function in a touch chip by adopting an electrostatic field detection manner. Specifically, after a first terminal having a first capacitive touch screen converts data to be transmitted into binary data, a voltage is applied to electrodes involved in the data transmission on the first capacitive touch screen, and the corresponding electric field distribution is formed; and, when a second terminal having a second capacitive touch screen contacts the first terminal, the second terminal would detect the electric field distribution, and decodes the corresponding data.

Although with the near field communication method of the above capacitive touch screen terminal, the near field communication function may be integrated in one touch chip, which simplifies the hardware structure, because of the electrostatic field detection manner, if the size difference between the first capacitive contact screen and the second capacitive touch screen is large, it will cause the data cannot be transmitted; meanwhile, after starting the near field communication, it is unable to accurately detect that the change in the electrostatic field is caused by conductors becoming near, or by terminal communicates therewith between the two capacitive touch screens, wherein the conductors are hand, and so on. Therefore, it is easy to start the data transmission incorrectly, resulting in poor user experience.

INVENTION SUMMARY

Technical problem to be solved by the present invention is to provide a near field communication method of a capacitive touch screen terminal. The present invention intends to solve the problem that in the existing near field communication method of the capacitive touch screen terminal, because of adopting an electrostatic field detection manner, the two touch screens having large size difference can not transmit data, or the data transmission is easy to be started incorrectly.

Embodiments of the invention are implemented in this way. A near field communication method of a capacitive touch screen terminal, wherein, a capacitive touch screen terminal used as a transmitting terminal and a capacitive touch screen terminal used as a receiving terminal both includes a touch sensor; said touch sensor includes a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said method includes the following steps:

a connection is established between said transmitting terminal and said receiving terminal;

said transmitting terminal converts the data to be transmitted into a frequency sequence; and said frequency sequence is transmitted through interaction between the transmitting electrodes and the receiving electrodes of said transmitting terminal and the transmitting electrodes and the receiving electrodes of said receiving terminal.

The present invention also provides a near field transmitting method of a capacitive touch screen terminal, wherein, said capacitive touch screen terminal includes a touch sensor; said touch sensor includes a plurality of driving electrodes and a plurality of sensing electrodes deployed on a substrate; at least one of said driving electrodes and said sensing electrodes are used as transmitting electrodes; at least one of said driving electrode and said sensing electrode are used as receiving electrodes; and said method includes the following steps:

establishing a connection with the capacitive touch screen terminal used as a receiving terminal;

converting the data to be transmitted into a frequency sequence; and transmitting said frequency sequence through interaction between said transmitting electrodes and said receiving electrodes, and said receiving terminal.

The present invention also provides a near field receiving method of a capacitive touch screen terminal, wherein, said capacitive touch screen terminal includes a touch sensor; said touch sensor includes a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said method includes the following steps:

establishing a connection with the capacitive touch screen terminal used as a transmitting terminal; and transmitting a frequency sequence through interaction between said transmitting electrodes and said receiving electrodes and said transmitting terminal.

The present invention also provides a transmitting terminal, wherein, said transmitting terminal is a capacitive touch screen terminal; said capacitive touch screen terminal includes a touch sensor; said touch sensor includes a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said transmitting terminal further includes:

a first connection module, for establishing a connection with the capacitive touch screen terminal used as a receiving terminal;

a conversion module, for converting data to be transmitted into a frequency sequence; and a first transmission module, for transmitting said frequency sequence converted by said conversion module through interaction between said transmitting electrodes and said receiving electrodes and said receiving terminal.

The present invention also provides a receiving terminal, wherein, said receiving terminal is a capacitive touch screen terminal; said capacitive touch screen terminal includes a touch sensor; said touch sensor includes a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said receiving terminal further includes:

a second connection module, for establishing a connection with the capacitive touch screen terminal used as a transmitting terminal; and a second transmission module, for transmitting a frequency sequence by utilizing interaction between said transmitting electrodes and said receiving electrodes and said transmitting terminal.

The present invention also provides a near field communication system of a capacitive touch screen terminal, comprising a transmitting terminal and a receiving terminal, wherein, said transmitting terminal is the transmitting terminal as described above, and said receiving terminal is the receiving terminal as described above.

In the near field communication method and system of the capacitive touch screen terminal proposed in the present invention, the near field communication is realized through multiplexing the driving and sensing electrodes of the touch sensor in the capacitive touch screen by the transmitting terminal and the receiving terminal, and the frequency sequence is adopted as a carrier of data transmission, so compared to the electrostatic field detection manner adopted in the prior art, it may be suitable for the near field communication between two capacitive touch screen terminals having a large size difference; meanwhile, after starting the near field communication, the two capacitive touch screens can accurately distinguish whether the change in the electrostatic field is caused by conductors becoming near, or by terminal communicates therewith, wherein the conductors are hand, and so on. Therefore, the reliability while the data transmission is started is improved and the user experience is optimized.

DETAILED EMBODIMENTS

To make the objects, technical solutions and advantages of the present invention become clearer, the present invention will be further illustrated in detail in combination with accompanying drawings and embodiments. It should be understood that the specific embodiments described herein are only to explain the present invention and are not intended to limit the present invention.

In order to solve the problems existed in the prior art, in a near field communication method of a capacitive touch screen terminal provided in the present invention, driving and sensing electrodes of a touch sensor in a capacitive touch screen are multiplexed to realize the near field communication, and a frequency sequence is used as a carrier of data transmission.

In the present invention, a capacitive touch screen terminal used as a transmitting terminal and a capacitive touch screen terminal used as a receiving terminal both include touch sensors, wherein the touch sensors includes a plurality of driving electrodes and a plurality of sensing electrodes deployed on a substrate, and at least one of the driving electrodes and the sensing electrodes are used as transmitting electrodes, and at least one of the driving electrodes and the sensing electrodes are used as receiving electrodes.

Figure 1:
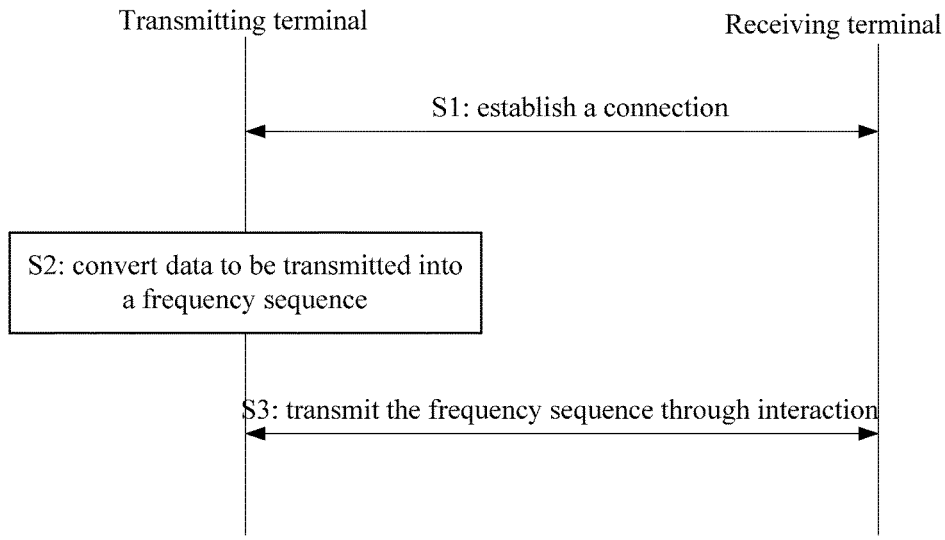
FIG. 1 is a flowchart of a near field communication method of a capacitive touch screen terminal provided in a first embodiment of the present invention.

FIG. 1 shows a flowchart of a near field communication method of a capacitive touch screen terminal provided in a first embodiment of the present invention, comprising:

Step S1: establishing a connection between the capacitive touch screen terminal used as a transmitting terminal and the capacitive touch screen terminal used as a receiving terminal.

Step S2: converting, by the transmitting terminal, data to be transmitted into a frequency sequence.

Figure 2:
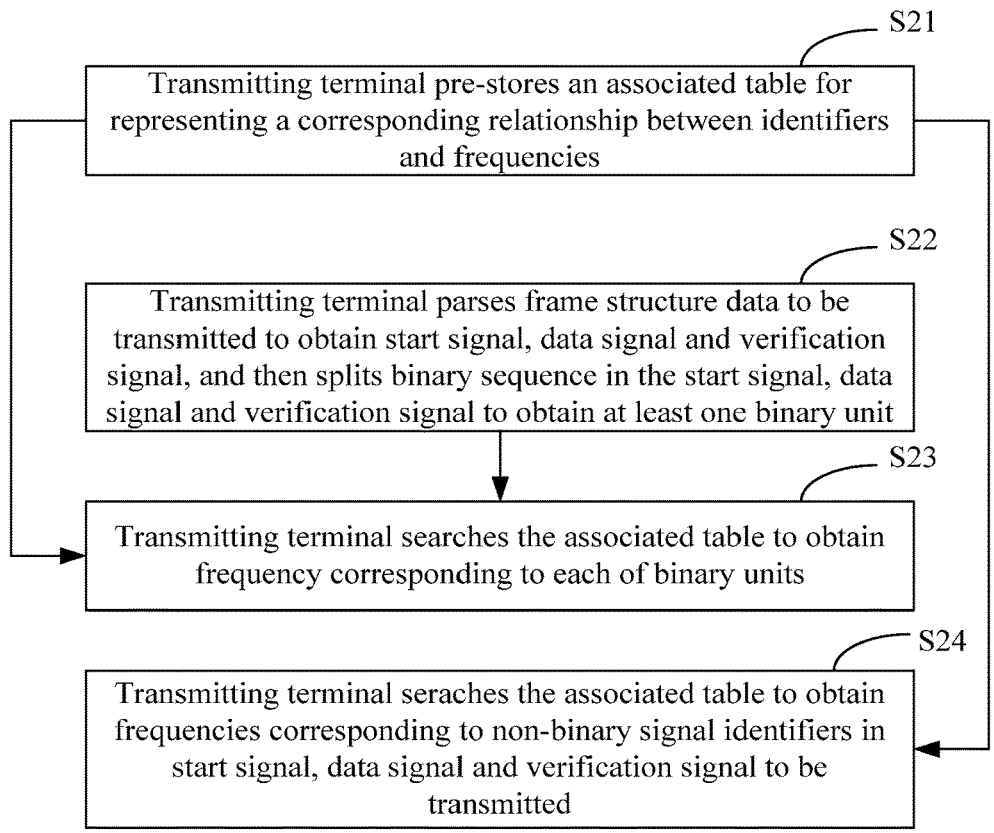
FIG. 2 is a detailed flowchart of transmitting terminal converting data to be transmitted into a frequency sequence in the first embodiment of the present invention.

In the first embodiment of the present invention, the data to be transmitted may be represented in the form of a frame structure, and each frame structure may include a start signal, a data signal and a verification signal. The verification signal is obtained through calculation according to a length characteristic of the frame structure to be transmitted and in combination with the data signal; and the start signal is substantially fixed, or part of the start signal relates to the length characteristic of the frame structure to be transmitted. At this time, as shown in FIG. 2, step S2 may also include:

Step S21: the transmitting terminal pre-stores an associated table of a corresponding relationship between signal identifiers and frequencies.

In the first embodiment of the present invention, the signal identifiers may include a binary signal identifier and a non-binary signal identifier, and frequencies corresponding to different signal identifiers are different from each other.

Wherein, according to different number of frequencies that may be allocated to the binary signal identifiers, the number of bits in each binary signal identifier may also be different. If the number of frequencies that may be allocated to the binary signal identifiers is N, and the number of bits in each binary signal identifier is n, then:

$N=2^n$.

For example, if the number of frequencies that may be allocated to the binary signal identifiers is 4, then each frequency may represent the binary signal identifier of 2 bits. If the number of frequencies that may be allocated to the binary signal identifiers is 8, then each frequency may represent the binary signal identifier of 3 bits. Wherein, the non-binary signal identifier is used independently or is used in combination with the binary signal identifier, so as to represent certain functions, for example, start, retransmission, and verification information, etc. The following table 1 shows an associated table in an intuitive storage form:

TABLE 1

| signal identifier | frequency | signal identifier | frequency |
|---|---|---|---|
| START | FY | 01 | F01 |
| SYNC | FX | 10 | F10 |
| 00 | F00 | 11 | F11 |

Figure 3:
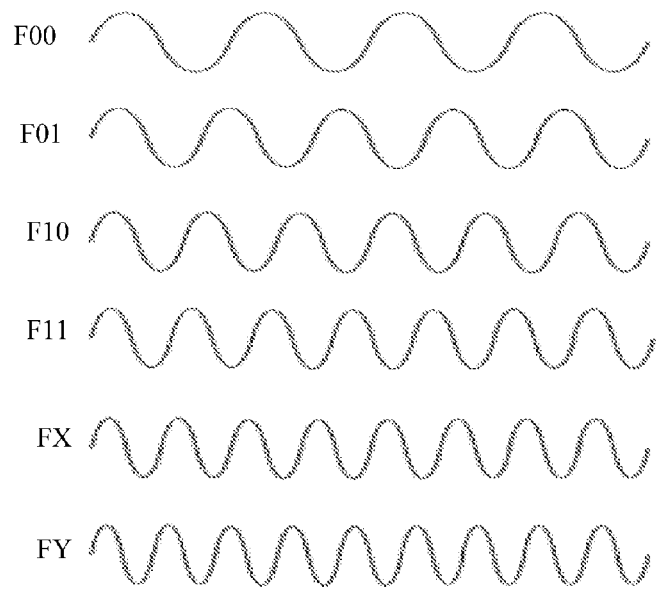
FIG. 3 is a schematic diagram of a frequency waveform corresponding to each signal identifier in the first embodiment of the present invention.

Wherein, the signal identifier START is used as a first non-binary signal identifier, and the signal identifier SYNC is used as a second non-binary signal identifier, and signal identifiers 00, 01, 10, and 11 are used as the binary signal identifiers respectively. FIG. 3 shows a waveform diagram of frequencies FY, FX, F00, F01, F10, F11, which is only a waveform example. In practice, there may be other waveforms.

Step S22: the transmitting terminal parses the data of the frame structure to be transmitted to obtain the start signal, data signal and verification signal. After that, the binary sequences of the start signal, data signal and verification signal are split to obtain at least one binary unit. The number of bits in each binary unit equals to the number of bits in the binary signal identifier in the association table.

Step S23: the transmitting terminal searches the associated table to obtain a frequency corresponding to each binary unit.

Step S24: the transmitting terminal searches the associated table to obtain the frequencies corresponding to the non-binary signal identifiers in the start signal, data signal and verification signal to be transmitted, and further obtains the frequency sequence of the start signal, the frequency sequence of the data signal and the frequency sequence of the verification signal. The frequency sequence of the start signal, the frequency sequence of the data signal and the frequency sequence of the verification signal, in turn, constitute a frequency sequence in the form of the frame structure.

For example, if the start signal is SYNC+SYNC+SYNC+START+START+00, and the data signal is a binary sequence 0001101101010011 with 16 bits, and the verification signal is SYNC+11, then after the step S23 and the step S24, the frequency sequence of the start signal is obtained as FX FX FX FY FY F00, and the frequency sequence of the data signal is obtained as F00F01F10F11F01F01F00F11, and the frequency sequence of the verification signal is obtained as FX F11.

Step S3: transmitting the frequency sequence through interaction between the transmitting electrodes and receiving electrodes in the transmitting terminal and the transmitting electrodes and receiving electrodes in the receiving terminal.

Figure 4:
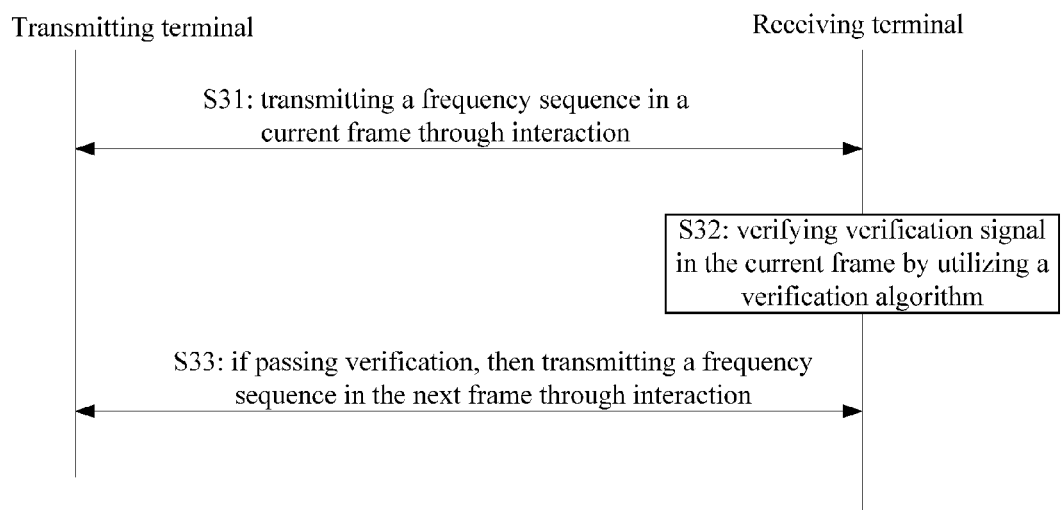
FIG. 4 is a detailed flowchart of transmitting the frequency sequence through interaction between the transmitting terminal and the receiving terminal in the first embodiment of the present invention.

Furthermore, as shown in FIG. 4, step S3 may also include:

Step S31: transmitting the frequency sequence in the current frame through interaction between the transmitting terminal and the receiving terminal.

Figure 5:
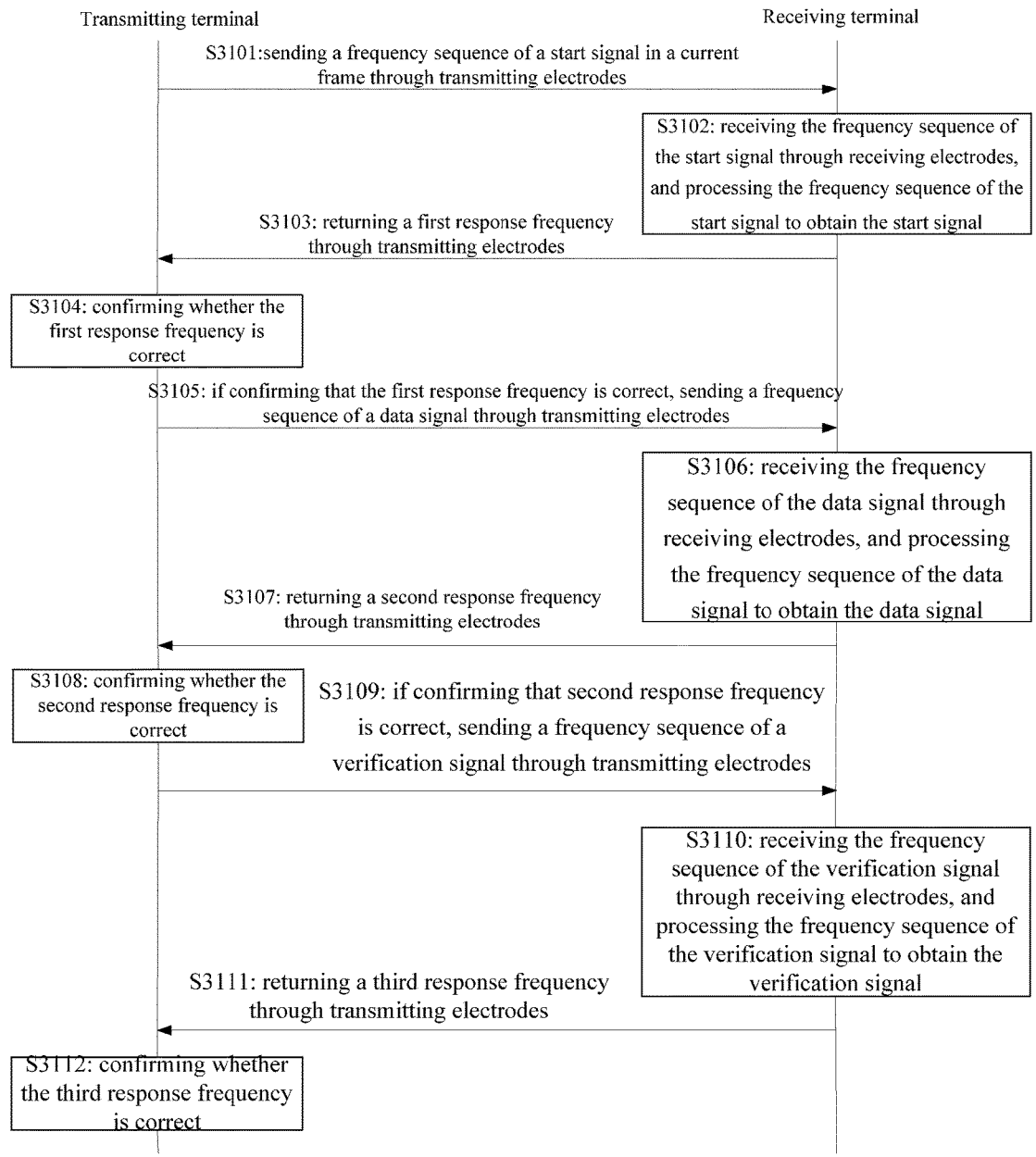
FIG. 5 is a detailed flowchart of transmitting the frequency sequence in the current frame through interaction between the transmitting terminal and the receiving terminal in the first embodiment of the present invention.

Further, as shown in FIG. 5, step S31 may also include:

Step S3101: the transmitting terminal sends the frequency sequence of the start signal in the current frame to the receiving terminal through the transmitting electrodes.

Step S3102: the receiving terminal receives the frequency sequence of the start signal through the receiving electrodes, and processes the frequency sequence of the start signal to obtain the start signal.

Step S3103: the receiving terminal returns a first response frequency to the transmitting terminal through the transmitting electrodes.

Step S3104: the transmitting terminal confirms whether the first response frequency is correct by utilizing a verification algorithm, and if the first response frequency is correct, then performs step S3105, and if the transmitting terminal does not receive the first response frequency in a certain time or the first response frequency is not correct, then confirms whether the retried times exceeds a preset value, and if the retried times does not exceed the preset value, then re-transmits the frequency sequence which was transmitted just now and the frequency sequence of the start signal in the current frame through the transmitting electrodes. Wherein, the verification algorithm may be a parity algorithm.

Step S3105: if the transmitting terminal confirms that the first response frequency is correct, then the frequency sequence of the data signal is transmitted to the receiving terminal through the transmitting electrodes.

Step S3106: the receiving terminal receives the frequency sequence of the data signal through the receiving electrodes, and processes the frequency sequence of the data signal. The frequency sequence may be converted into the data signal according to the association table.

Step S3107: the receiving terminal returns a second response frequency to the transmitting terminal through the transmitting electrodes.

Step S3108: the transmitting terminal confirms whether the second response frequency is correct by utilizing the verification algorithm, and if the second response frequency is correct, then performs step S3109, and if the transmitting terminal does not receiving the second response frequency in a certain time or the second response frequency is not correct, then confirms whether the retried times exceeds the preset value, and if the retried times does not exceed the preset value, then re-transmits the frequency sequence which was transmitted just now and the frequency sequence of the data signal in the current frame through the transmitting electrodes. Wherein, the verification algorithm may be the parity algorithm.

For example, if adopting the parity algorithm, the data signal to be transmitted is a 16-bit binary sequence 0001101101010011, and the even parity value of the binary sequence is 11, then after the transmitting terminal transmits the frequency sequence F00F01F10F11F01F01F00F11 of the data signal in the current frame, if the frequency F11 transmitted by the receiving terminal is not received, or incorrect frequency, for example, F10, F00, etc., is received, then the transmitting terminal confirming whether the retried times exceeds 5 times, and if the retried times exceeds 5 times, then the transmission fails and the thread is exited. If the retried times does not exceed 5 times, then the transmitting terminal uses the frequency FY as a re-transmitting frequency sequence, and uses the frequency FY as a start point to retransmit the frequency sequence of the data signal in the current frame, i.e., transmitting frequency sequence FY F00F01F10F11F01F01F00F11. In practice, the retried times may be set according to an actual condition, and is not limit to 5 times.

Of course, in practice, the data signal to be transmitted may be divided into multiple transfers. For example, if the data signal to be transmitted is four bytes, two bytes therein may be transmitted as one transmission unit. That is, the transmitting terminal transmits data of two bytes one time to the receiving terminal. If the transmitting terminal determines that the response returned by the receiving terminal is correct, then the data of next two bytes is transmitted, and whether the response returned by the receiving terminal is corrected is determined. If the response returned by the receiving terminal is not correct, then the transmitting terminal may utilize the above retransmission mechanism and retransmit the data of two bytes in this transmission.

Step S3109: if the transmitting terminal confirms that the second response frequency is correct, the frequency sequence of the verification signal is sent to the receiving terminal through the transmitting electrodes.

Step S3110: the receiving terminal receives the frequency sequence of the verification signal through the receiving electrodes, and processes the frequency sequence of the verification signal to obtain the verification signal.

Step S3111: the receiving terminal returns a third response frequency to the transmitting terminal through the transmitting electrodes.

Step S3112: the transmitting terminal confirms whether a third response frequency is correct by utilizing the verification algorithm. If the third response frequency is correct, then considering that the current frame is successfully transmitted and turning to step S33. If the transmitting terminal does not receive the third response frequency in a certain time or the third response frequency is not correct, then confirming whether the retried times exceeds the preset value, and if the retried times does not exceed the preset value, then re-transmitting the frequency sequence which was transmitted just now and the frequency sequence of the verification signal in the current frame through the transmitting electrodes. Wherein, the verification algorithm may be the parity algorithm Step S32: verifying, by the receiving terminal, the verification signal in the current frame by utilizing the verification algorithm.

In the first embodiment of the present invention, the receiving terminal can utilize verification algorithms to realize a frame verification function, for example, sum value verification, xor verification, or CRC 16 verification, etc. If the verification signal in the current frame and the verification value obtained by the receiving terminal utilizing the verification algorithm are not equal, then it reflects that the received current frame is wrong or the received verification signal is wrong, and thereafter, a remediation process is needed, for example, notifying the transmitting terminal in a certain manner to retransmit, re-receiving the current frame by the receiving terminal, so as to ensure the correctness of data transmission.

Step S33: if the verification is passed, then transmitting a frequency sequence in the next frame through the interaction between the transmitting terminal and the receiving terminal.

Figure 6:
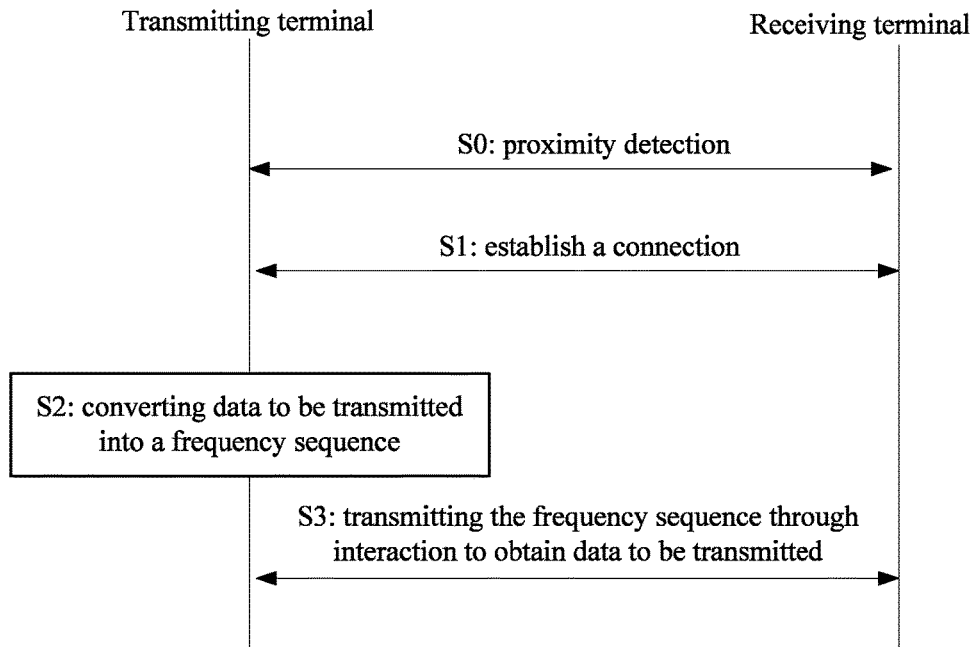
FIG. 6 is a flowchart of a near field communication method of a capacitive touch screen terminal provided in a second embodiment of the present invention.

FIG. 6 shows a process of a near field communication method of a capacitive touch screen terminal provided in a second embodiment of the present invention. Different from the first embodiment, at this time, before the step S1, further comprising:

Step S0: performing a proximity detection between a transmitting terminal and a receiving terminal to find the receiving terminal communicating with the transmitting terminal, and the transmitting terminal communicating with the receiving terminal.

Figure 7:
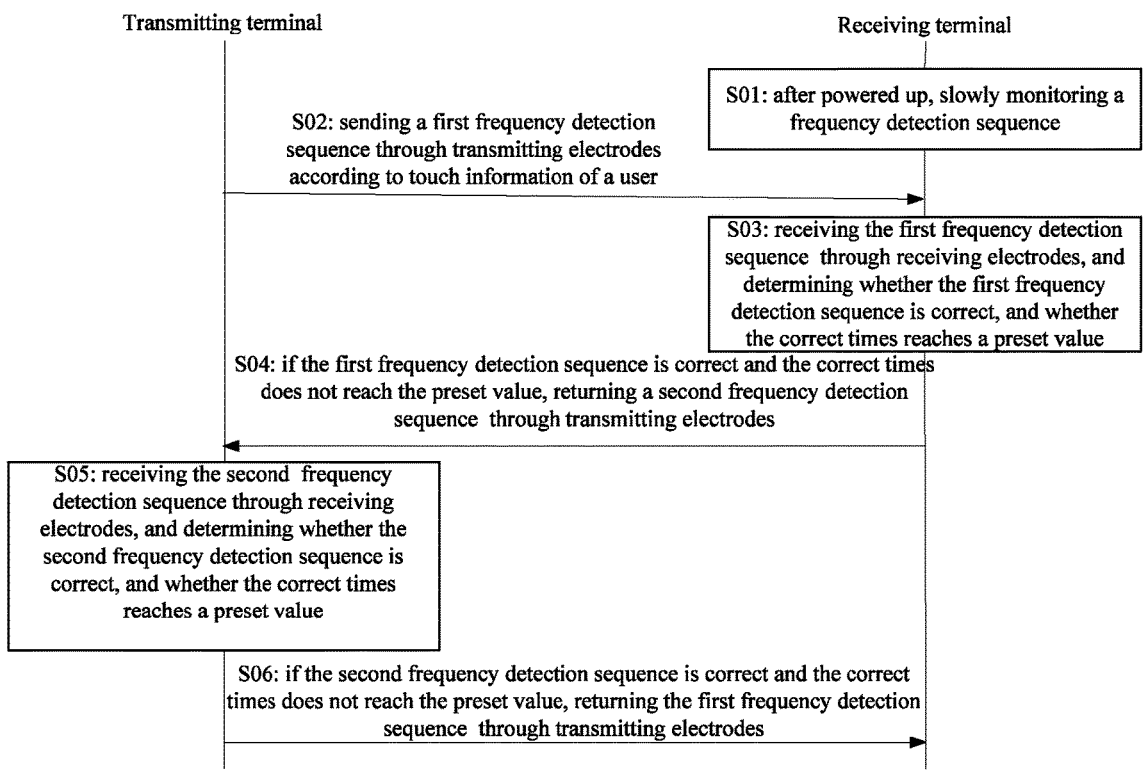
FIG. 7 is a detailed flowchart of performing a proximity detection between the transmitting terminal and the receiving terminal in the second embodiment of the present invention.

As shown in FIG. 7, step S0 further comprising:

Step S01: after powered up, the receiving terminal slowly monitors a frequency detection sequence.

In the second embodiment of the present invention, slowly monitoring the frequency detection sequence means that, adding an idle process IDLE between the adjacent data transmission process LINK and the touch detection process TP, and in the idle process IDLE, a touch chip of the receiving terminal does not work, and does not response any request or perform any operation related to the near field communication and the touch detection. The reason of setting the idle process IDLE is that: in a general application, after powered up, the receiving terminal needs to start the near field communication function immediately and enter the proximity detection, and if the execution is too frequently, it would result in large power consumption. Therefore, in order to reduce the power consumption of the receiving terminal, the idle process IDLE is set.

Step S02: the transmitting terminal sends a first frequency detection sequence through the transmitting electrodes according to the touch information of a user.

Herein, the touch information of the user means that: the user selects a document to be transmitted at the transmitting terminal and selects a near field communication manner to transmit. As after powered up, the transmitting terminal may start the near field communication function according to the touch information of the user, it does not need to set the idle process IDLE as in the receiving terminal.

In the second embodiment of the present invention, a first frequency detection sequence is a particular frequency sequence, and preferably, in order to avoid data transmission failure due to irregular interference frequency of a liquid crystal display, the first frequency detection sequence includes a plurality of regularly arranged frequencies. For example, the first frequency detection sequence may be arranged in a rule of 1010. At this time, if the first frequency detection sequence includes 2 FX frequencies and 2 FY frequencies, then it may be arranged into FX FY FX FY, thus improving the accuracy of the proximity detection.

Step S03: the receiving terminal receives the first frequency detection sequence through the receiving electrodes, and determines whether the first frequency detection sequence is correct, and whether the correct times reaches the preset value.

In the second embodiment of the present invention, if the receiving terminal determines the first frequency detection sequence is correct and the correct times does not reach the preset value, then performing step S04, and continuing to monitor the first frequency detection sequence transmitted by the transmitting terminal. If the receiving terminal determines the first frequency detection sequence is correct and the correct times does not reach the preset value, then considering that the transmitting terminal communicating therewith is successfully detected, and returning a second frequency detection sequence to the transmitting terminal through the transmitting electrodes. If the receiving terminal determines the first frequency detection sequence is not correct, then the proximity detection being failed for this time.

At this time, further, if the receiving terminal determines the first frequency detection sequence is correct and the correct times reaches the preset value, then the receiving terminal further turns off the liquid crystal display of the receiving terminal, in order to reduce the impact of the liquid crystal display which is directly attached to the touch panel on the data transmission.

In the second embodiment of the present invention, the receiving terminal switches to monitoring the frequency detection sequence in a full speed, i.e., removing the idle process IDLE between the adjacent data transmission process LINK and the touch detection process TP, so that the receiving terminal accomplishes the proximity detection as soon as possible.

Step S04: if the first frequency detection sequence is correct and the correct times does not reach the preset value, then the receiving terminal returns a second frequency detection sequence to the transmitting terminal through the transmitting electrodes.

In the second embodiment of the present invention, the second frequency detection sequence is a particular frequency sequence. Likewise, the second frequency detection sequence includes a plurality of regular arranged frequencies, in order to prevent data transmission failure due to irregular interference frequency of the liquid crystal display.

Step S05: the transmitting terminal receives the second frequency detection sequence through the receiving electrodes, and determines whether the second frequency detection sequence is correct, and whether the correct times reaches the preset value.

In the second embodiment of the present invention, if the transmitting terminal determines the second frequency detection sequence is correct and correct times does not reach the preset value, then performing step S06. If the transmitting terminal determines the second frequency detection sequence is correct, and the correct times reaches the preset value, then considering that the receiving terminal communicating therewith is successfully detected, and returning the first frequency detection sequence to the receiving terminal through the transmitting electrodes. If the transmitting terminal determines that the second frequency detection sequence is not correct, then the proximity detection being failed.

At this time, further, if the transmitting terminal determines that the second frequency detection sequence is correct, and the correct times reaches the preset value, then the transmitting terminal further turns off the liquid crystal display of the transmitting terminal, in order to reduce the impact of the liquid crystal display which is directly attached to the touch panel on the data transmission.

Step S06: when the second frequency detection sequence is correct and the correct times does not reach the preset value, then the transmitting terminal returns the first frequency detection sequence to the receiving terminal through the transmitting electrodes.

Furthermore, in the second embodiment of the present invention, since the driving electrodes and sensing electrodes of the capacitive touch screen are multiplexed, proximity detection and touch detection may be performed alternatively at the transmitting terminal and the receiving terminal.

Figure 8:
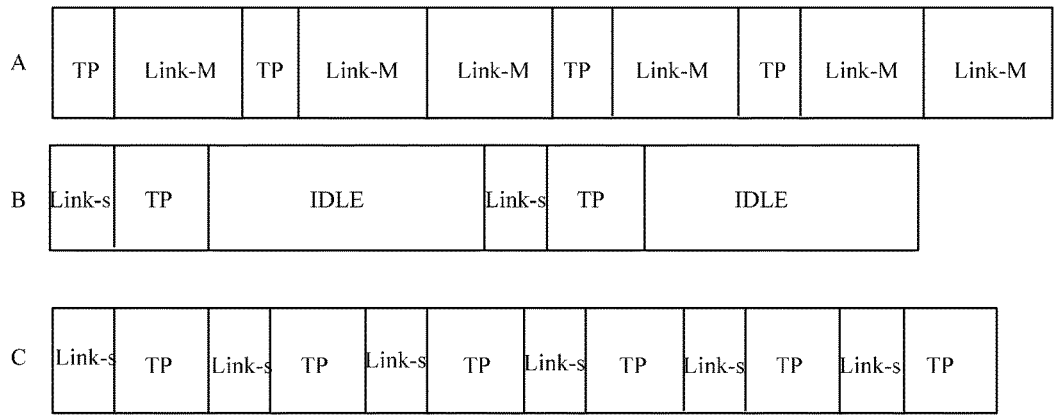
FIG. 8 is a timing comparison diagram among a touch detection and a proximity detection of the transmitting terminal, a touch detection and a proximity detection of the receiving terminal under a slow speed monitor detection, and a touch detection and a proximity detection of the receiving terminal under a full speed monitor detection.

FIG. 8 shows timing comparison diagram of a touch detection and a proximity detection of a transmitting terminal, a touch detection and a proximity detection of the receiving terminal under slow speed monitor detection, and a touch detection and a proximity detection of the receiving terminal under the full speed monitor detection.

Wherein, A is a timing diagram of performing the touch detection and proximity detection for the transmitting terminal, and B is a timing diagram of performing the touch detection and proximity detection for the receiving terminal under slow speed monitor detection, and C is a timing diagram of switching to a full speed monitor detection for the receiving terminal after a valid signal of the transmitting terminal is detected.

Further, TP is a regular touch detection process; Link-M refers to a process that the transmitting terminal transmits a frequency sequence of the proximity detection and detects whether the response returned by the receiving terminal is correct; Link-S refers to a process that the receiving terminal monitors a frequency sequence transmitted by the transmitting terminal; and IDLE is an idle process, wherein the larger the percentage of the duration of the idle process is, the lower the power consumption of the system is.

Figure 9:
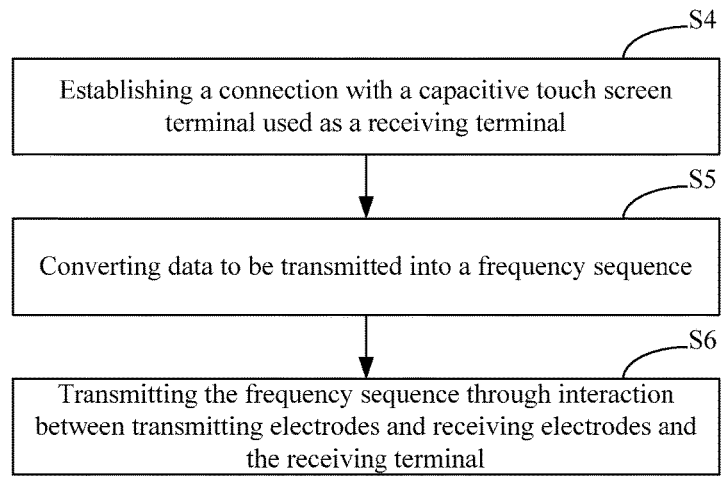
FIG. 9 is a flowchart of a near field transmission method of a capacitive touch screen terminal provided in a third embodiment of the present invention.

FIG. 9 shows a process of a near-field transmitting method of a capacitive touch screen terminal provided in a third embodiment of the present invention, comprising:

Step S4: establishing a connection with a capacitive touch screen terminal used as a receiving terminal.

Step S5: converting the data to be transmitted into a frequency sequence.

In the third embodiment of the present invention, the data to be transmitted may be represented in the form of a frame structure, each frame structure comprising a start signal, data signal and verification signal. At this time, step S5 may also include:

Step S51: pre-storing an associated table for representing the corresponding relationship between the signal identifiers and frequencies, wherein the associated table is as described in the first embodiment, and is not repeated here.

Step S52: parsing the frame structure data to be transmitted to obtain the start signal, data signal and verification signal, and then splitting the binary sequences in the start signal, data signal and verification signal to obtain at least one binary unit, wherein the number of bits in each binary unit equals to the number of bits in the binary signal identifier in the associated table.

Step S53: searching the associated table to obtain a frequency corresponding to each of the binary units.

Step S54: searching the associated table to obtain the frequencies corresponding to the non-binary signal identifiers in the start signal, data signal and verification signal to be transmitted, thus obtaining the frequency sequence of the start signal, the frequency sequence in the data signal, and the frequency sequence in the verification signal. The frequency sequence of the start signal, the frequency sequence of the data signal, and the frequency sequence of the verification signal, in turn, constitute the frequency sequence in the form of the frame structure.

Step S6: transmitting the frequency sequence through interaction between the transmitting electrodes and the receiving electrodes and the receiving terminal. Further, the step S6 may also include:

Step S61: transmitting the frequency sequence in the current frame through interaction between the transmitting electrodes and the receiving electrodes and the receiving terminal. Further, the step S61 may also include:

Step S6101: sending the frequency sequence of the start signal in the current frame to the receiving terminal through transmitting electrodes.

Step S6102: confirming whether a first response frequency returned by the receiving terminal is correct by utilizing a verification algorithm, and if the first response frequency is correct, then performing step S3103, and if the first response frequency is not received in a certain time or the first response frequency is not correct, then confirming whether the retried times exceeds a preset value, and if the retried times does not exceed the preset value, then re-transmitting the frequency sequence transmitted just now and the frequency sequence of the start signal in the current frame through the transmitting electrodes. Wherein, the verification algorithm may be a parity algorithm.

Step S6103: if confirming that the first response frequency is correct, then sending the frequency sequence of the data signal to the receiving terminal through the transmitting electrodes.

Step S6104: confirming whether a second response frequency returned by the receiving terminal is correct by utilizing a verification algorithm, and if the second response frequency is correct, then performing step S6105, and if the second response frequency is not received in a certain time or the second response frequency is not correct, then confirming whether the retried times exceeds a preset value, and if the retried times does not exceed the preset value, then re-transmitting the frequency sequence transmitted just now and the frequency sequence of the data signal in the current frame through the transmitting electrodes. Wherein, the verification algorithm may be the parity algorithm.

Step S6105: if confirming the second response frequency is correct, sending the frequency sequence of the verification signal to the receiving terminal through the transmitting electrodes.

Step S6106: confirming whether a third response frequency returned by the receiving terminal is correct by utilizing a verification algorithm, and if the third response frequency is correct, then considering that the current frame is successfully transmitted and turning to step S62, and if the third response frequency is not received in a certain time or the third response frequency is not correct, then confirming whether the retried times exceeds a preset value, and if the retried times does not exceed the preset value, then re-transmitting the frequency sequence transmitted just now and the frequency sequence of the verification signal in the current frame through the transmitting electrodes. Wherein, the verification algorithm may be the parity algorithm.

Step S62: if passing the verification of the verification signal in the current frame, then transmitting, by the receiving terminal, the frequency sequence in the next frame through interaction between the transmitting electrodes and receiving electrodes and the receiving terminal.

Figure 10:
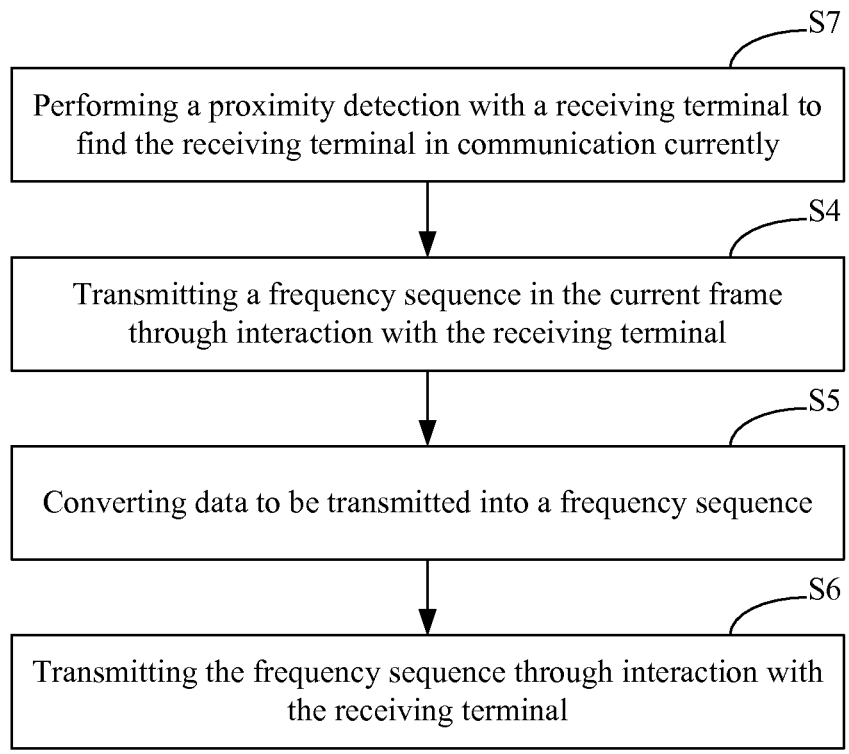
FIG. 10 is a flowchart of a near field transmitting method of a capacitive touch screen terminal provide in a fourth embodiment of the present invention.

FIG. 10 shows a process of a near field transmitting method of a capacitive touch screen terminal provided in the fourth embodiment of the present invention. Different from the third embodiment, at this time, before the step S4, further comprising:

Step S7: performing a proximity detection with the receiving terminal to find the receiving terminal which is currently in communication. Further, the step S7 may include:

Step S71: according to the touch information of a user, sending a first frequency detection sequence through the transmitting electrodes. Wherein, the description on touch information and the first frequency detection sequence is as described in the second embodiment, and is not repeated here.

Step S72: receiving a second frequency detection sequence returned by the receiving terminal through the receiving electrodes, and determining whether the second frequency detection sequence is correct, and whether the correct times reaches a preset value.

In the fourth embodiment of the present invention, if it is determined that the second frequency detection sequence is correct, and the correct times does not reach the preset value, then performing step S73. If it is determined that the second frequency detection sequence is correct and the correct times reaches the preset value, then considering that the receiving terminal communicating therewith is successfully detected, and returning the first frequency detection sequence to the receiving terminal through the transmitting electrodes. If it is determined that the second frequency detection sequence is not correct, then the proximity detection is failed.

Further, if it is determined that the first frequency detection sequence is correct and the correct times reaches the preset value, then the liquid crystal display is further turned off, in order to reduce the impact of the liquid crystal display directly attached to the touch panel on the data transmission.

Step S73: if the second frequency detection sequence is correct and the correct times does not reach the preset value, then returning the first frequency detection sequence to the receiving terminal through the transmitting electrodes.

Furthermore, in the fourth embodiment of the present invention, since the driving electrodes and sensing electrodes of the capacitive touch screen are multiplexed, the proximity detection and touch detection may be performed alternatively. The details are as described in the second embodiment and are not repeated here.

Figure 11:
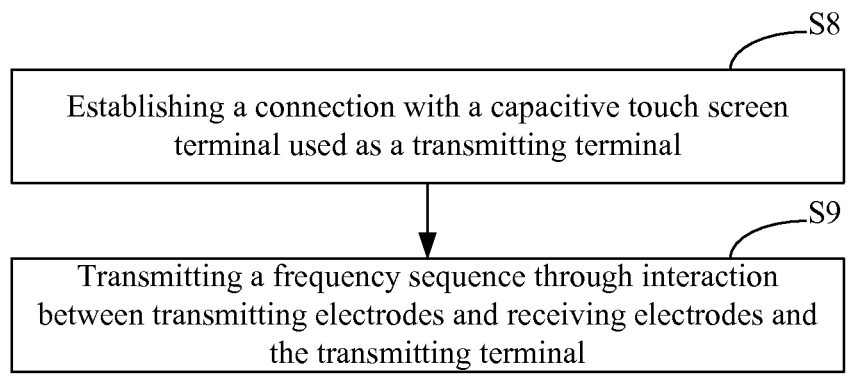
FIG. 11 is a flowchart of a near field receiving method of a capacitive touch screen terminal provided in a fifth embodiment of the present invention.

FIG. 11 shows a process of a near field receiving method of a capacitive touch screen terminal provided in a fifth embodiment of the present invention.

Step S8: establishing a connection with a capacitive touch screen terminal used as a transmitting terminal.

Step S9: transmitting a frequency sequence through interaction between the transmitting electrodes and receiving electrodes and the transmitting terminal. Further, step S9 may also include:

Step S91: transmitting the frequency sequence in the current frame through the interaction with the transmitting terminal. Further, step S91 may also include:

Step S9101: receiving the frequency sequence of the start signal in the current frame sent by the transmitting terminal through the receiving electrodes, and processing the frequency sequence of the start signal to obtain the start signal.

Step S9102: returning a first response frequency to the transmitting terminal through the transmitting electrodes.

Step S9103: if the transmitting terminal confirms that the first response frequency is correct, then receiving the frequency sequence of the data signal in the current frame sent by the transmitting terminal through the receiving electrodes, and processing the frequency sequence of the data signal to obtain the data signal.

Step S9104: returning a second response frequency to the transmitting terminal through the transmitting electrodes.

Step S9105: if the transmitting terminal confirms that the second response frequency is correct, then receiving the frequency sequence of the verification signal in the current frame sent by the transmitting terminal through the receiving electrodes, and processing the frequency sequence of the verification signal to obtain the verification signal.

Step S9106: returning a third response frequency to the transmitting terminal through the transmitting electrodes.

Step S92: verifying the verification signal in the current frame by utilizing a verification algorithm. The verification procedure is as described in the first embodiment, and is not repeated here.

Step S93: if the verification is passed, then transmitting the frequency sequence in the next frame through the interaction with the transmitting terminal.

Figure 12:
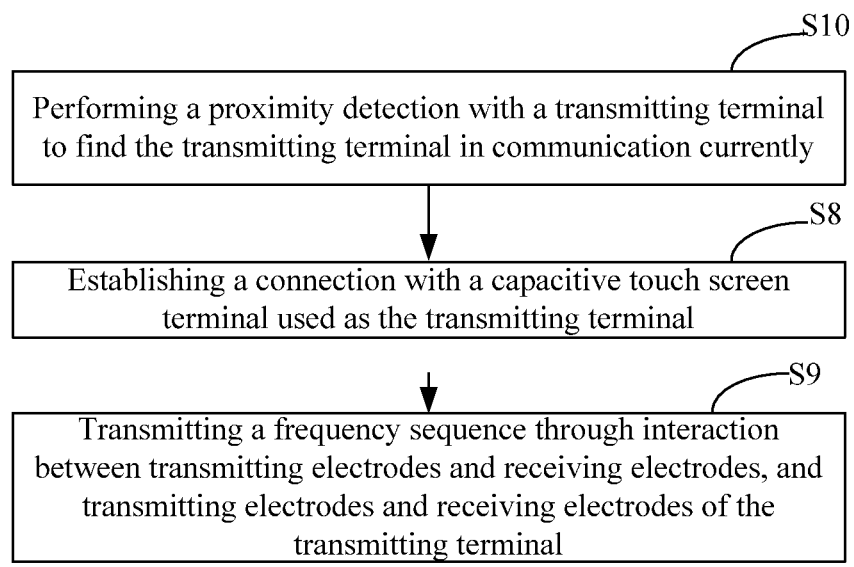
FIG. 12 is a flowchart of a near field receiving method of a capacitive touch screen terminal provided in a sixth embodiment of the present invention.

FIG. 12 shows a process of a near field receiving method of a capacitive touch screen terminal provided in a sixth embodiment of the present invention. At this time, different from the fifth embodiment, before the step S8, also comprising:

Step S10: performing a proximity detection with the transmitting terminal to find the transmitting terminal currently in communication. Further, the step S10 may also include:

Step S101: after powered up, slowly monitoring the frequency detection sequence. The description regarding slowly monitoring the frequency detection sequence is as described in the second embodiment and is not repeated here.

Step S102: receiving a first frequency detection sequence sent by the transmitting terminal through the receiving electrodes and determining whether the first frequency detection sequence is correct and whether the correct times reaches a preset value.

In the sixth embodiment of the present invention, if it is determined that the first frequency detection sequence is correct, and the correct times does not reach the preset value, then performing step S103, and continuing to monitor the first frequency detection sequence transmitted by the transmitting terminal. If it is determined that the first frequency detection sequence is correct and the correct times reaches the preset value, then considering that the transmitting terminal in communication therewith is successfully detected, and returning a second frequency detection sequence to the transmitting terminal through the transmitting electrodes. If it is determined that the first frequency detection sequence is not correct, then the proximity detection is failed for this time.

At this time, further, if the first frequency detection sequence is determined to be correct and the correct times reaches the preset value, then the liquid crystal display is further turned off, in order to reduce the impact of the liquid crystal display which is directly attached to the touch panel on the data transmission.

In the sixth embodiment of the present invention, after receiving the first frequency detection sequence through the receiving electrodes for the first time, switching to monitor the frequency detection sequence in a full speed, i.e., removing an idle process IDLE between an adjacent data transmission process LINK and touch detection process TP, so as to accomplish the proximity detection as soon as possible.

Step S103: if the first frequency detection sequence is correct and the correct times does not reach the preset value, then returning the second frequency detection sequence to the transmitting terminal through the transmitting electrodes. The description regarding the second frequency detection sequence is as described in the second embodiment, and is not repeated here.

Figure 13:
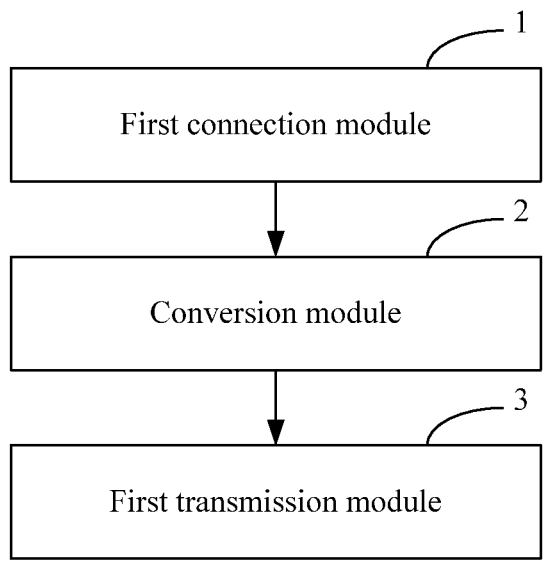
FIG. 13 is a structure diagram of a transmitting terminal provided in a seventh embodiment of the present invention.

FIG. 13 shows a structure of a transmitting terminal provided in a seventh embodiment of the present invention. For convenience of illustration, only the parts related to the seventh embodiment of the present invention are shown.

The transmitting terminal provided in the seventh embodiment of the present invention is a capacitive touch screen terminal, and includes a touch sensor which includes a plurality of driving electrodes and a plurality of sensing electrodes deployed on a substrate, wherein at least one of the driving electrodes and the sensing electrodes are used as the transmitting electrodes, and at least one of the driving electrodes and the sensing electrodes are used as the receiving electrodes. The transmitting terminal also includes: a first connection module 1, for establishing a connection with a capacitive touch screen terminal used as a receiving terminal; a conversion module 2, for converting the data to be transmitted into a frequency sequence; a first transmission module 3, for transmitting the frequency sequence obtained from the conversion of the conversion module 2 through the interaction between the transmitting electrodes and the receiving electrodes.

Preferably, the first connection module 1, conversion module 2 and the first transmission module 3 may be integrated in a touch chip of the transmitting terminal.

Figure 14:
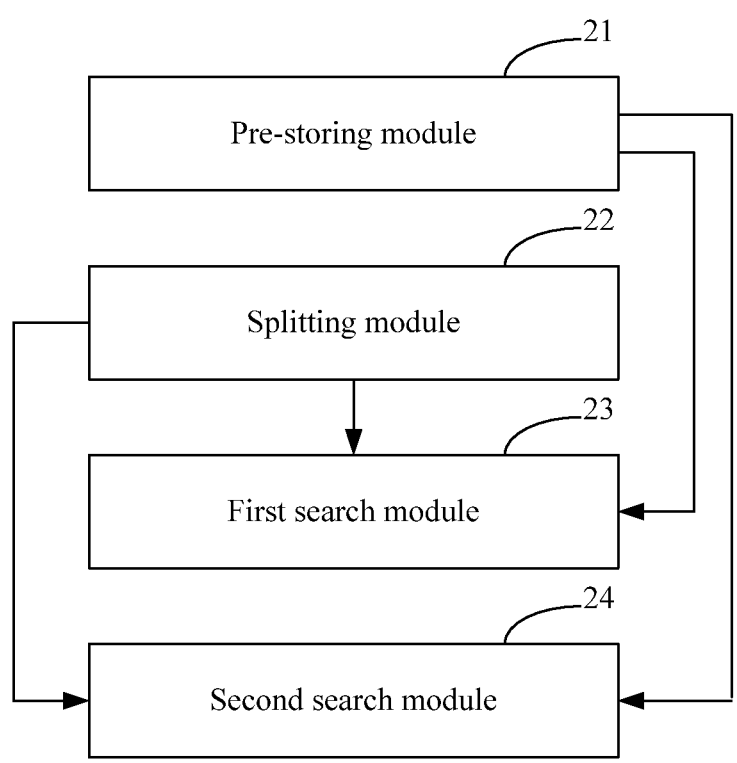
FIG. 14 is a detailed structure diagram of a conversion module in a seventh embodiment of the present invention.

Wherein, as shown in FIG. 14, the conversion module 2 may include: a pre-storing module 21, for pre-storing an associated table representing a corresponding relationship between the signal identifiers and frequencies, wherein the associated table is as described in the first embodiment and is not repeated here; a splitting module 22, for splitting the binary sequences of the start signal, data signal and verification signal to be transmitted to obtain at least one binary unit, wherein the number of bits in each binary unit equals to the number of bits in the binary signal identifier in the associated table; a first search module 23, for searching the associated table pre-stored by the pre-stored module 21 to obtain frequency corresponding to each binary unit; a second search module 24, for searching the associated table pre-stored by the pre-stored module 21 to obtain the frequencies corresponding to the non-binary signal identifiers in the start signal, data signal and verification signal to be transmitted, thus obtaining the frequency sequence of the start signal, the frequency sequence of the data signal and the frequency sequence of the verification signal. The frequency sequence of the start signal, the frequency sequence of the data signal and the frequency sequence of the verification signal, in turn, constitute a frequency sequence in the form of a frame structure.

Wherein, the first transmission module 3 may include: a first transmission control module 31, for transmitting the frequency sequence in the current frame through interaction between the transmitting electrodes and receiving electrodes and the transmitting electrodes and the receiving electrodes of the receiving terminal, and when the receiving terminal passes the verification of the verification signal in the current frame, transmitting the frequency sequence in the next frame through interaction with the receiving terminal.

Figure 15:
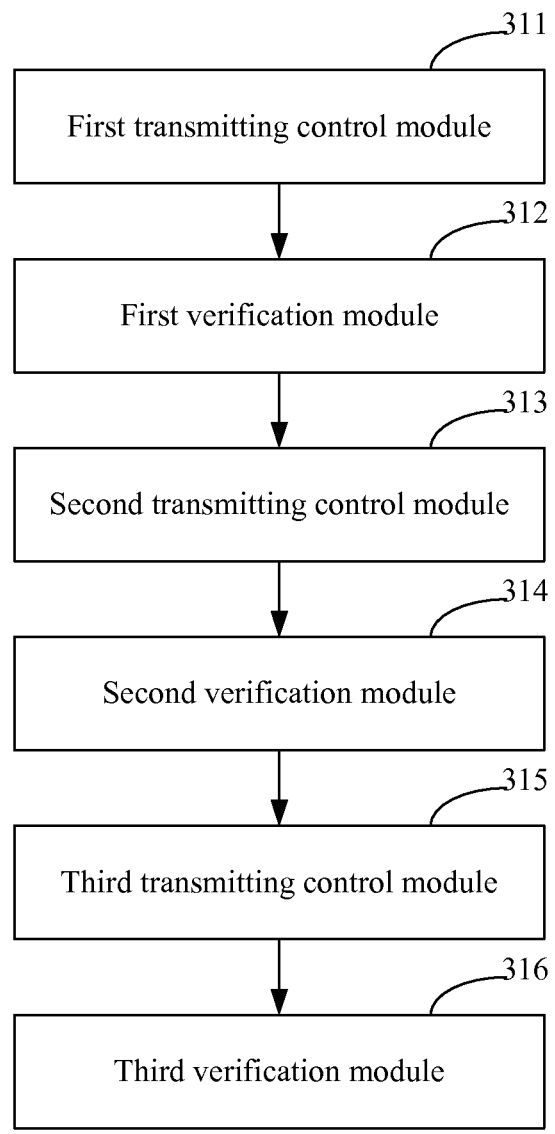
FIG. 15 is a detailed structure diagram of a first transmission control module in the seventh embodiment of the present invention.

Further, as shown in FIG. 15, a first transmission control module 31 may also include: a first transmitting control module 311, for sending the frequency sequence of the start signal in the current frame to the receiving terminal through the transmitting electrodes; a first verification module 312, for confirming whether a first response frequency returned by the receiving terminal is correct by utilizing a verification algorithm, and if the first response frequency is not received in a certain time or the first response frequency is not correct, then confirming whether the retried times exceeds a preset value, and if the retried times does not exceed the preset value, then retransmitting the frequency sequence transmitted just now and the frequency sequence of the start signal in the current frame through the transmitting electrodes; a second transmitting control module 313, for when the verification module 312 confirms that the first response frequency is correct, sending the frequency sequence of the data signal to the receiving terminal through the transmitting electrodes; a second verification module 314, for confirming whether the second response frequency returned by the receiving terminal is correct by utilizing the verification algorithm, and if the second response frequency is not received in a certain time or the second response frequency is not correct, then confirming whether the retried times exceeds the preset value, and if the retried times does not exceed the preset value, then re-transmitting the frequency sequence transmitted just now and the frequency sequence of the data signal in the current frame through the transmitting electrodes; a third transmitting control module 315, for when the second verification module 314 confirms that the second response frequency is correct, sending the frequency sequence of the verification signal to the receiving terminal through the transmitting electrodes; a third verification module 316, for confirming whether a third response frequency returned by the receiving terminal is correct by utilizing the verification algorithm, and if the third response frequency is not received in a certain time or the third response frequency is not correct, then confirming whether the re-tried times exceeds the preset value, and if the re-tried times does not exceed the preset value, then re-transmitting the frequency sequence transmitted just now and the frequency sequence of the verification signal in the current frame through the transmitting electrodes.

Figure 16:
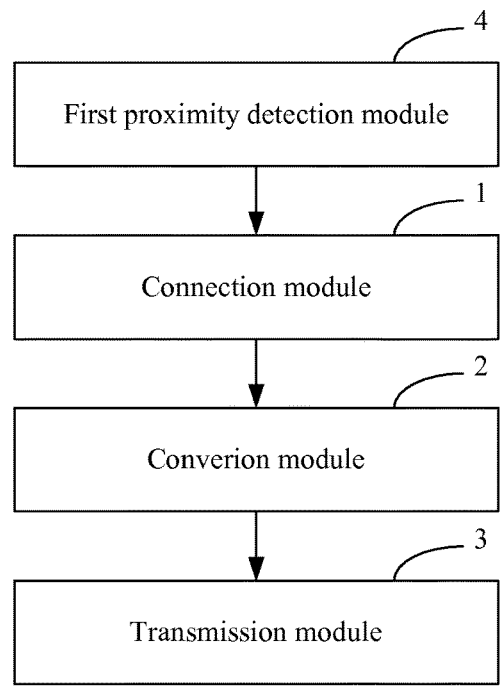
FIG. 16 is a structure diagram of a transmitting terminal provided in an eighth embodiment of the present invention.

FIG. 16 shows the structure of a transmitting terminal provided in an eighth embodiment of the present invention. For the convenience of illustration, only the parts related to the eighth embodiment of the present invention are shown.

Different from the seventh embodiment, at this time, the transmitting terminal also includes: a first proximity detection module 4, for performing the proximity detection with the receiving terminal to find the receiving terminal currently in communication. And likewise, preferably, the first proximity detection module 4 may be integrated in the touch chip of the transmitting terminal.

Figure 17:
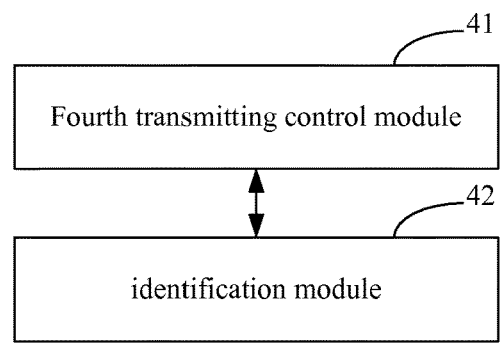
FIG. 17 is a detailed structure diagram of a first proximity detection module in the eighth embodiment of the present invention.

Further, as shown in FIG. 17, the first proximity detection module 4 may include: a fourth transmitting control module 41, for sending the first frequency detection sequence through the transmitting electrodes according to the touch information of the user, wherein the description on the touch information and the first frequency detection sequence is as described in the second embodiment, and is not repeated here; an identification module 42, for receiving the second frequency detection sequence returned by the receiving terminal through the receiving electrodes, and determining whether the second frequency detection sequence is correct, and whether the correct times reaches the preset value, and if the second frequency detection sequence is correct and the correct times does not reach the preset value, returning the first frequency detection sequence by the fourth transmitting control module 41 to the receiving terminal through the transmitting electrodes, and if the second frequency detection sequence is correct, and the correct times reaches the preset value, then considering that the receiving terminal in communication therewith is successfully detected, and returning the first frequency detection sequence by the fourth transmitting control module 41 to the receiving terminal through the transmitting electrodes, and if the second frequency detection sequence is not correct, then the proximity detection being failed.

Further, if the identification module 42 determines that the first frequency detection sequence is correct and the correct times reaches the preset value, then the identification module 42 is further used for turning off the liquid crystal display, in order to reduce the impact of the liquid crystal display directly attached to the touch panel on the data transmission.

Furthermore, in the eighth embodiment of the present invention, since the driving electrodes and the sensing electrodes of the capacitive touch screen are multiplexed, the proximity detection and touch detection may be alternatively performed. The details are as described in the second embodiment and are not repeated here.

Figure 18:
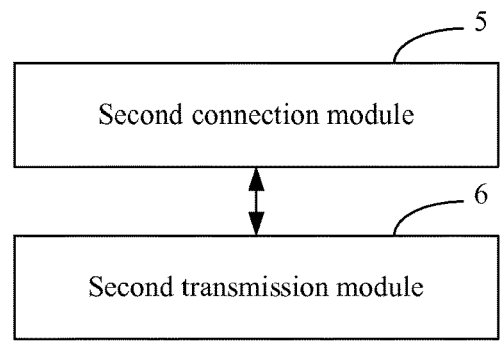
FIG. 18 is a structure diagram of a receiving terminal provided in a ninth embodiment of the present invention.

FIG. 18 shows the structure of a receiving terminal provided in a ninth embodiment of the present invention. For convenience of illustration, only the parts related to the ninth embodiment of the present invention are shown.

The receiving terminal provided in the ninth embodiment of the present invention is a capacitive touch screen terminal, and includes a touch sensor which includes a plurality of driving electrodes and a plurality of sensing electrodes deployed on a substrate, wherein, at least one of the driving electrodes and sensing electrodes are used as transmitting electrodes, and at least one of the driving electrodes and sensing electrodes are used as receiving electrodes. The receiving terminal also includes: a second connection module 5, for establishing a connection with the capacitive touch screen terminal used as the transmitting terminal; a second transmission module 6, for transmitting the frequency sequence by utilizing the interaction between the transmitting electrodes and receiving electrodes and the transmitting terminal.

Preferably, the second connection module 5 and the second transmission module 6 may be integrated in a touch chip of the receiving terminal.

Figure 19:
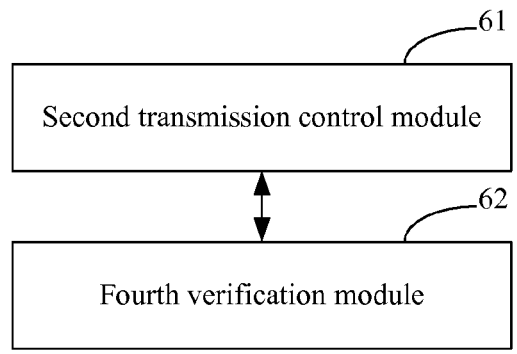
FIG. 19 is a detailed structure diagram of a second transmission module in the ninth embodiment of the present invention.

Further, as shown in FIG. 19, the second transmission module 6 may also include: a second transmission control module 61, for transmitting the frequency sequence in the current frame by utilizing the interaction between the transmitting electrodes and receiving electrodes and the transmitting electrodes and the receiving electrodes of the transmitting terminal; a fourth verification module 62, for verifying the verification signal in the current frame by utilizing the verification algorithm. And if the verification is passed, then the second transmission control module 61 transmits the frequency sequence in the next frame by utilizing the interaction between the transmitting electrodes and receiving electrodes and the transmitting electrodes and receiving electrodes of the transmitting terminal. The verification procedure is as described in the first embodiment, and is not repeated here.

Figure 20:
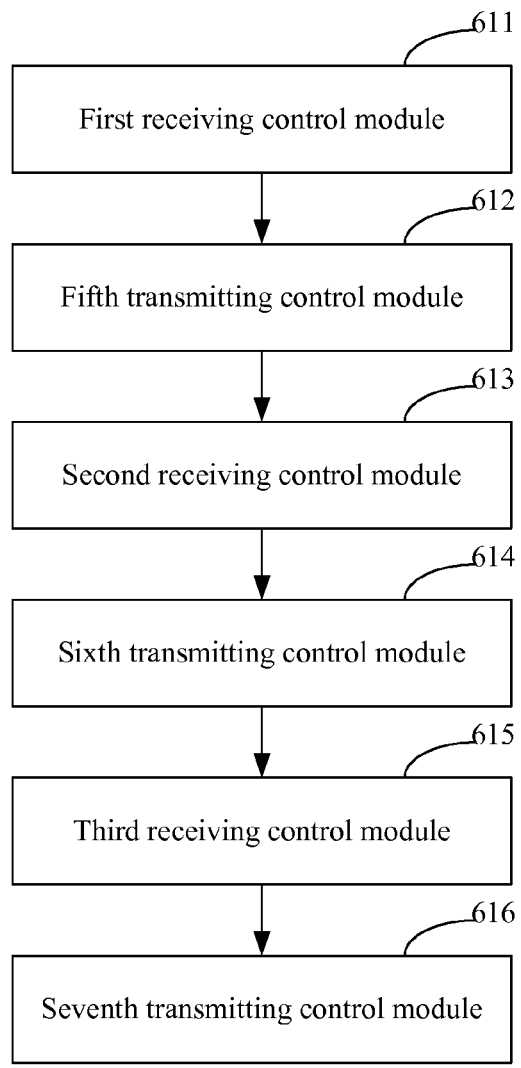
FIG. 20 is a detailed structure diagram of a second transmission control module in the ninth embodiment of the present invention.

Further, as shown in FIG. 20, the second transmission control module 61 may also include: a first receiving control module 611, for receiving the frequency sequence of the start signal in the current frame sent by the transmitting terminal through the receiving electrodes, and processing the frequency sequence of the start signal to obtain the start signal; a fifth transmitting control module 612, for returning a first response frequency to the transmitting terminal through the transmitting electrodes; a second receiving control module 613, for when the transmitting terminal confirms that the first response frequency is correct, receiving the frequency sequence of the data signal in the current frame sent by the transmitting terminal through the receiving electrodes, and processing the frequency sequence of the data signal to obtain the data signal; a sixth transmitting control module 614, for returning a second response frequency to the transmitting terminal through the transmitting electrodes; a third receiving control module 615, for when the transmitting terminal confirms that the second response frequency is correct, receiving the frequency sequence of the verification signal in the current frame sent by the transmitting terminal through the receiving electrodes, and processing the frequency sequence of the verification signal to obtain the verification signal; and a seventh transmitting control module 616, for returning a third response frequency to the transmitting terminal through the transmitting electrodes.

Figure 21:
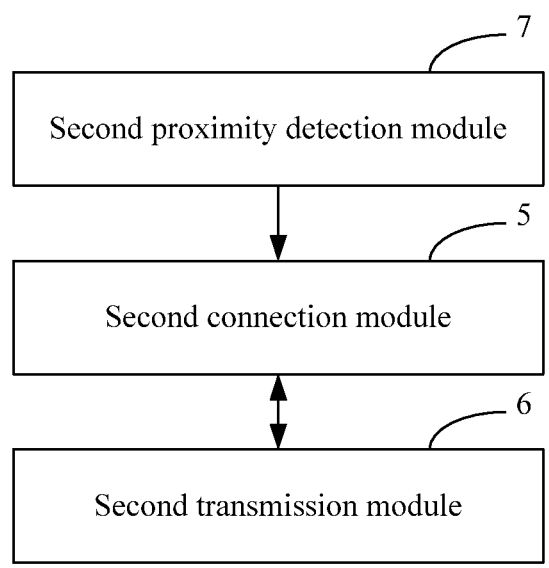
FIG. 21 is a structure diagram of a receiving terminal provided in a tenth embodiment of the present invention.

FIG. 21 shows the structure of a receiving terminal provided in a tenth embodiment of the present invention. For convenience of illustration, only parts related to the tenth embodiment of the present invention are shown.

Different from the ninth embodiment, at this time, the receiving terminal may also include: a second proximity detection module 7, for performing the proximity detection with the transmitting terminal to find the transmitting terminal currently in communication. And likewise, preferably, the second proximity detection module 7 may be integrated in a touch chip of the receiving terminal.

Figure 22:
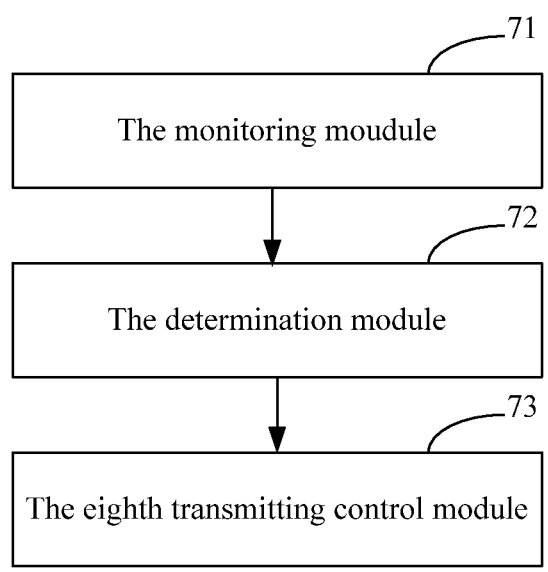
FIG. 22 is a detailed structure diagram of a second proximity detection module in the tenth embodiment of the present invention.

Further, as shown in FIG. 22, the second proximity detection module 7 may further include: a monitor module 71, for slowly monitoring the frequency detection sequence after powered up, wherein the description regarding slowly monitoring the frequency detection sequence is as described in the second embodiment, and is not repeated here; a determination module 72, for receiving a first frequency detection sequence sent by the transmitting terminal through the receiving electrodes, and determining whether the first frequency detection sequence is correct and whether the correct times reaches the preset value; and a eighth transmitting control module 73, for when the determination module 72 determines that the first frequency detection sequence is correct and the correct times does not reach the preset value, returning a second frequency detection sequence to the transmitting terminal through the transmitting electrodes, wherein the description regarding the second frequency detection sequence is as described in the second embodiment, and is not repeated here.

In a tenth embodiment of the present invention, the eighth transmitting control module 73 is also used for returning the second frequency detection sequence to the transmitting terminal through the transmitting electrodes when the determination module 72 determines that the first frequency detection sequence is correct and the correct times reaches the preset value.

In the tenth embodiment of the present invention, the determination module 72 is also used for turning off the liquid crystal display when determining that the first frequency detection sequence is correct, and the correct times reaches the preset value.

In the tenth embodiment of the present invention, the monitoring module 71 is further used for switching to monitor the frequency detection sequence in a full speed after the determination module 72 receives the first frequency detection sequence through the receiving electrodes for the first time, i.e., removing an idle process IDLE between an adjacent data transmission process LINK and the touch detection process TP, so as to accomplish the proximity detection as soon as possible.

An eleventh embodiment of the present invention proposes a near field communication system of a capacitive touch screen terminal, comprising the above-mentioned transmitting terminal and receiving terminal and is not repeated here.

In the near field communication method of the capacitive touch screen terminal and system thereof proposed in the present invention, the transmitting terminal and the receiving terminal multiplex the driving electrodes and the sensing electrodes of the touch sensor in the capacitive touch screen to realize the near field communication, and the frequency sequence is used as a carrier of data transmission. Compared to utilize an electrostatic field detection manner in the prior art, it may suitable for the near field communication between two capacitive touch screen terminals with a large size difference. Meanwhile, after starting the near field communication, the two capacitive touch screens can accurately distinguish whether a change in the electrostatic field is caused by conductors becoming near, or by the terminal communicating with it, wherein the conductors are hand, and so on. Therefore, the reliability while the data transmission is started is improved and the user experience is optimized. Furthermore, when the transmitting terminal and the receiving terminal transmit the frame data, each transmission frame may also be verified and the start signal, data signal, and the verification signal in the frame may be further verified. If the verification is not correct, a re-transmitting mechanism is introduced, thus ensuring the reliable transmission of the frame data. Furthermore, after the transmitting terminal and the receiving terminal become close, the proximity detection may also be performed, and the proximity detection and touch detection may be alternatively performed. Through multiple confirmations, the relative terminal in communication therewith is found. In this way, the touch detection and near field communication functions may be integrated in a common touch chip, thus improving the integration level of the touch chip and reducing the volume of the product. Furthermore, if the relative terminal in communication therewith is found through the proximity detection, then the liquid crystal display may be controlled to be turned off, so as to reduce the interference of the liquid crystal display to the near field communication. Furthermore, for the receiving terminal, it may slowly monitor the frequency detection sequence when the relative terminal is not detected after powered up, but may be switched to monitor the frequency detection sequence in a full speed after receiving the frequency detection sequence for the first time, thus saving the power consumption.

Those of ordinary skill in the art would understand that the realization of all or part of the steps in the above-mentioned embodiments of the methods may be accomplished through controlling related hardware by a program, wherein said program may be stored in a computer readable storage media, for example, ROM/RAM, disk, CD-ROM, and so on.

The above description is only the preferred embodiments of the present invention, and it is not intended to limit the invention. Any modifications, equivalent substitutions, improvements and so on made within the spirit and principle of the present invention should be contained in the protection scope of the present invention.

What is claimed is:

1. A near field communication method of a capacitive touch screen terminal, characterized in that, a capacitive touch screen terminal used as a transmitting terminal and a capacitive touch screen terminal used as a receiving terminal both comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said method comprises the following steps:
   a connection is established between said transmitting terminal and said receiving terminal;
   said transmitting terminal converts data to be transmitted into a frequency sequence; wherein said data to be transmitted is represented in the form of a frame structure, each of which comprises a start signal, a data signal and a verification signal;
   said frequency sequence in a current frame is transmitted through interaction between the transmitting electrodes and the receiving electrodes of said transmitting terminal and the transmitting electrodes and the receiving electrodes of said receiving terminal;
   said receiving terminal verifies the verification signal in said current frame by utilizing a verification algorithm; and
   if passing the verification, then said transmitting terminal transmits a frequency sequence in the next frame through interaction with said receiving terminal.

2. The near field communication method of the capacitive touch screen terminal according to claim 1, characterized in that, said data to be transmitted is represented in the form of a frame structure, each of which comprises a start signal, a data signal and a verification signal, wherein the step of said transmitting terminal converting data to be transmitted into the frequency sequence further comprises the following steps:
   said transmitting terminal pre-stores an associated table representing the corresponding relationship between signal identifiers and frequencies, said signal identifiers comprising binary signal identifiers and non-binary signal identifiers, and frequencies corresponding to different signal identifiers are different from each other;
   said transmitting terminal parses frame structure data to be transmitted to obtain the start signal, data signal and verification signal, and then splits binary sequences in said start signal, data signal and verification signal to obtain at least one binary unit, wherein the number of bits in each of said binary unit equals to the number of bits in said binary signal identifier in said associated table;
   said transmitting terminal searches said associated table to obtain a frequency corresponding to each of said binary unit; and
   said transmitting terminal searches said associated table to obtain frequencies corresponding to non-binary signal identifiers in said start signal, data signal and verification signal which are to be transmitted, thereby obtaining the frequency sequence in said start signal, the frequency sequence in said data signal and the frequency sequence in said verification signal.

3. The near field communication method of the capacitive touch screen terminal according to claim 1, characterized in that, the step of said transmitting terminal transmitting the frequency sequence in the current frame through interaction with said receiving terminal further comprises the following steps:
   said transmitting terminal sends the frequency sequence of the start signal in said current frame to said receiving terminal through the transmitting electrodes;
   said receiving terminal receives the frequency sequence of said start signal through the receiving electrodes, and processes the frequency sequence of said start signal to obtain said start signal;
   said receiving terminal returns a first response frequency to said transmitting terminal through the transmitting electrodes;
   said transmitting terminal confirms whether the first response frequency is correct by utilizing the verification algorithm;
   if confirming that said first response frequency is correct, then said transmitting terminal sends the frequency sequence of the data signal to said receiving terminal through the transmitting electrodes;
   said receiving terminal receives the frequency sequence of said data signal through the receiving electrodes, and processes the frequency sequence of said data signal to obtain said data signal;
   said receiving terminal returns a second response frequency to said transmitting terminal through the transmitting electrodes;
   said transmitting terminal confirms whether said second response frequency is correct by utilizing the verification algorithm;
   if confirming that said second response frequency is correct, said transmitting terminal sends the frequency sequence of the verification signal to said receiving terminal through the transmitting electrodes;
   said receiving terminal receives the frequency sequence of said verification signal through the receiving electrodes, and processes the frequency sequence of said verification signal to obtain said verification signal;
   said receiving terminal returns a third response frequency to said transmitting terminal through the transmitting electrodes; and
   said transmitting terminal confirms whether said third response frequency is correct by utilizing the verification algorithm; and if being correct, said current frame is considered to be transmitted successfully.

4. The near field communication method of the capacitive touch screen terminal according to claim 1, characterized in that, prior to the step of establishing the connection between the transmitting terminal and the receiving terminal, the method further comprises a step of performing a proximity detection between said transmitting terminal and said receiving terminal, and the step of performing the proximity detection between the transmitting terminal and the receiving terminal further comprises the following steps:

after said receiving terminal powers up, slowly monitoring a frequency detection sequence;

said transmitting terminal sends a first frequency detection sequence through the transmitting electrodes according to the touch information of a user;

the receiving terminal receives said first frequency detection sequence through the receiving electrodes, and determines whether said first frequency detection sequence is correct, and whether the correct times reaches a preset value;

if said first frequency detection sequence is correct and the correct times does not reach the preset value, then said receiving terminal returns a second frequency detection sequence to said transmitting terminal through the transmission electrodes, and if said first frequency detection sequence is correct and the correct times reaches the preset value, then said transmitting terminal is detected successfully, and the second frequency detection sequence is returned to said transmitting terminal through the transmitting electrodes;

said transmitting terminal receives said second frequency detection sequence through the receiving electrodes, and determines whether said second frequency detection sequence is correct, and whether the correct times reaches the preset value; and if said second frequency detection sequence is correct and the correct times does not reach the preset value, then said transmitting terminal returns a first frequency detection sequence to said receiving terminal through the transmitting electrodes, and if said second frequency detection sequence is correct and the correct times reaches the preset value, then said receiving terminal is detected successfully, and the first frequency detection sequence is returned to said receiving terminal through the transmitting electrodes.

5. The near field communication method of the capacitive touch screen terminal according to claim 4, characterized in that, if said first frequency detection sequence is correct and the correct times reaches the preset value, then said receiving terminal further turns off liquid crystal display of said receiving terminal, and if said second frequency detection sequence is correct and the correct times reaches the preset value, then said transmitting terminal further turns off the liquid crystal display of said transmitting terminal.

6. The near field communication method of the capacitive touch screen terminal according to claim 4, characterized in that, at said transmitting terminal and said receiving terminal, said proximity detection and touch detection is performed alternatively.

7. A near field transmission method of a capacitive touch screen terminal, characterized in that, said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrode and said sensing electrode are used as receiving electrodes; and said method comprises the following steps:

establishing a connection with the capacitive touch screen terminal used as a receiving terminal;

converting data to be transmitted into a frequency sequence; wherein said data to be transmitted is represented in the form of a frame structure, each of which comprises a start signal, a data signal and a verification signal;

Transmitting said frequency sequence in a current frame through interaction between said transmitting electrodes and said receiving electrodes, and said receiving terminal; and transmitting the frequency sequence in the next frame by utilizing interaction between said transmitting electrodes and said receiving electrodes and said receiving terminal when the verification of the verification signal in said current frame is passed by said receiving terminal.

8. The near field transmission method of the capacitive touch screen terminal according to claim 7, characterized in that, said data to be transmitted is represented in the form of a frame structure, each of which comprises a start signal, a data signal and a verification signal, wherein the step of transmitting the frequency sequence in the current frame by utilizing interaction between said transmitting electrodes and said receiving electrodes and said receiving terminal further comprises the following steps:

sending the frequency sequence of the start signal in the current frame to said receiving terminal through said transmitting electrodes;

confirming whether the first response frequency returned by said receiving terminal is correct by utilizing the verification algorithm;

if confirming that the first response frequency is correct, sending the frequency sequence of the data signal to said receiving terminal through said transmitting electrodes;

confirming whether said second response frequency returned by said receiving terminal is correct by utilizing the verification algorithm;

if confirming that said second response frequency is correct, sending the frequency sequence of the verification signal to said receiving terminal through said transmitting electrodes;

confirming whether the third response frequency returned by said receiving terminal is correct by utilizing the verification algorithm; and if the verification of the verification signal in said current frame is passed by said receiving terminal, transmitting the frequency sequence in the next frame by utilizing interaction between said transmitting electrodes and said receiving electrodes and said receiving terminal.

9. The near field transmission method of the capacitive touch screen terminal according to claim 7, characterized in that, prior to the step of establishing the connection with the capacitive touch screen terminal used as the receiving terminal, said method further comprises a step of performing a proximity detection with the receiving terminal, and the step of performing the proximity detection with the receiving terminal further comprises the following steps:

sending the first frequency detection sequence through said transmitting electrodes according to the touch information of a user;

receiving the second frequency detection sequence returned by said receiving terminal through the receiving electrodes, and determining whether said second frequency detection sequence is correct, and whether the correct times reaches a preset value; and if said second frequency detection sequence is correct and the correct times does not reached the preset value, then returning the first frequency detection sequence to the receiving terminal through said transmitting electrodes, and if said second frequency detection sequence is correct and the correct times reaches the preset value, then successfully detecting said receiving terminal, and returning the first frequency detection sequence to said receiving terminal through said transmitting electrodes.

10. A near field receiving method of a capacitive touch screen terminal, characterized in that, said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said method comprises the following steps:
　　establishing a connection with the capacitive touch screen terminal used as a transmitting terminal; and
　　transmitting a frequency sequence in a current frame through interaction between said transmitting electrodes and said receiving electrodes and said transmitting terminal;
　　verifying the verification signal in said current frame by utilizing a verification algorithm; and
　　if passing the verification, transmitting the frequency sequence in the next frame through interaction with said transmitting terminal.

11. The near field receiving method of said capacitive touch screen terminal according to claim 10, characterized in that, the step of transmitting the frequency sequence in the current frame through interaction with said transmitting terminal further comprises the following steps:
　　receiving the frequency sequence of a start signal in the current frame sent by said transmitting terminal through said receiving electrodes, and processing the frequency sequence in said start signal to obtain the start signal;
　　returning a first response frequency to said transmitting terminal through said transmitting electrodes;
　　if confirming that the first response frequency is correct, then said transmitting terminal receiving the frequency sequence of a data signal in the current frame sent by said transmitting terminal through said receiving electrodes, and processing the frequency sequence of said data signal to obtain the data signal;
　　returning a second response frequency to said transmitting terminal through said transmitting electrodes;
　　if confirming that said second response frequency is correct, then said transmitting terminal receiving the frequency sequence of the verification signal in the current frame sent by said transmitting terminal through said receiving electrodes, and processing the frequency sequence of said verification signal to obtain the verification signal; and
　　returning a third response frequency to said transmitting terminal through said transmitting electrodes.

12. The near field receiving method of the capacitive touch screen terminal according to claim 10, characterized in that, prior to the step of establishing the connection with the capacitive touch screen terminal used as said transmitting terminal, the method further comprises a step of performing a proximity detection with said transmitting terminal, and said step of performing the proximity detection with said transmitting terminal further comprises the following steps:
　　after powered up, slowly monitoring a frequency detection sequence;
　　receiving the first frequency detection sequence sent by said transmitting terminal through said receiving electrodes, switching to a full speed monitor of the frequency detection sequence, determining whether said first frequency detection sequence is correct, and whether the correct times reaches a preset value;
　　if said first frequency detection sequence is correct and the correct times does not reach the preset value, then returning the second frequency detection sequence to said transmitting terminal through said transmitting electrodes, and if said first frequency detection sequence is correct and the correct times reaches the preset value, then successfully detecting said transmitting terminal, and returning a second frequency detection sequence to said transmitting terminal through said transmitting electrodes.

13. A transmitting terminal, said transmitting terminal being a capacitive touch screen terminal, characterized in that, said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said transmitting terminal further comprises a non-transitory storage medium and a processor;
　　wherein said non-transitory storage medium has computer-executable instructions which, when executed by said processor, cause said transmitting terminal to:
　　establish a connection with the capacitive touch screen terminal used as a receiving terminal;
　　convert data to be transmitted into a frequency sequence; wherein said data to be transmitted is represented in the form of a frame structure, each of which comprises a start signal, a data signal and a verification signal;
　　transmit said frequency sequence in a current frame through interaction between said transmitting electrodes and said receiving electrodes and said receiving terminal; and
　　transmit the frequency sequence in the next frame by utilizing interaction between said transmitting electrodes and said receiving electrodes and said receiving terminal when the verification of the verification signal in said current frame is passed by said receiving terminal.

14. A receiving terminal, said receiving terminal being a capacitive touch screen terminal, characterized in that, said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said receiving terminal further comprises a non-transitory storage medium and a processor;
　　wherein said non-transitory storage medium has computer-executable instructions which, when executed by said processor, caused said receiving terminal to:
　　establish a connection with the capacitive touch screen terminal used as a transmitting terminal; and
　　transmit a frequency sequence in a current frame by utilizing interaction between said transmitting electrodes and said receiving electrodes and said transmitting terminal;
　　verify the verification signal in said current frame by utilizing a verification algorithm; and transmit the frequency sequence in the next frame through interaction with said transmitting terminal when passing the verification.

15. A near field communication system of a capacitive touch screen terminal, comprising a transmitting terminal and a receiving terminal, said transmitting terminal being a capacitive touch screen terminal, wherein said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said transmitting terminal further comprises a first non-transitory storage medium and a first processor;

wherein said first non-transitory storage medium has computer-executable instructions which, when executed by said first processor, caused said transmitting terminal to:

establish a connection with the capacitive touch screen terminal used as a receiving terminal;

convert data to be transmitted into a frequency sequence; wherein said data to be transmitted is represented in the form of a frame structure, each of which comprises a start signal, a data signal and a verification signal;

transmit said frequency sequence in a current frame through interaction between said transmitting electrodes and said receiving electrodes and said receiving terminal; and transmit the frequency sequence in the next frame by utilizing interaction between said transmitting electrodes and said receiving electrodes and said receiving terminal when the verification of the verification signal in said current frame is passed by said receiving terminal;

said receiving terminal being a capacitive touch screen terminal, wherein said capacitive touch screen terminal comprises a touch sensor; said touch sensor comprises a plurality of driving electrodes and a plurality of sensing electrodes deployed on a substrate; at least one of said driving electrodes and said sensing electrodes are used as transmitting electrodes; at least one of said driving electrodes and said sensing electrodes are used as receiving electrodes; and said receiving terminal further comprises a second non-transitory storage medium and a second processor;

wherein said second non-transitory storage medium has computer-executable instructions which, when executed by said second processor, caused said receiving terminal to:

establish a connection with the capacitive touch screen terminal used as a transmitting terminal;

transmit a frequency sequence in the current frame by utilizing interaction between said transmitting electrodes and said receiving electrodes and said transmitting terminal;

verify the verification signal in said current frame by utilizing a verification algorithm; and transmit the frequency sequence in the next frame through interaction with said transmitting terminal when passing the verification.

\* \* \* \* \*